UNITED STATES PATENT OFFICE.

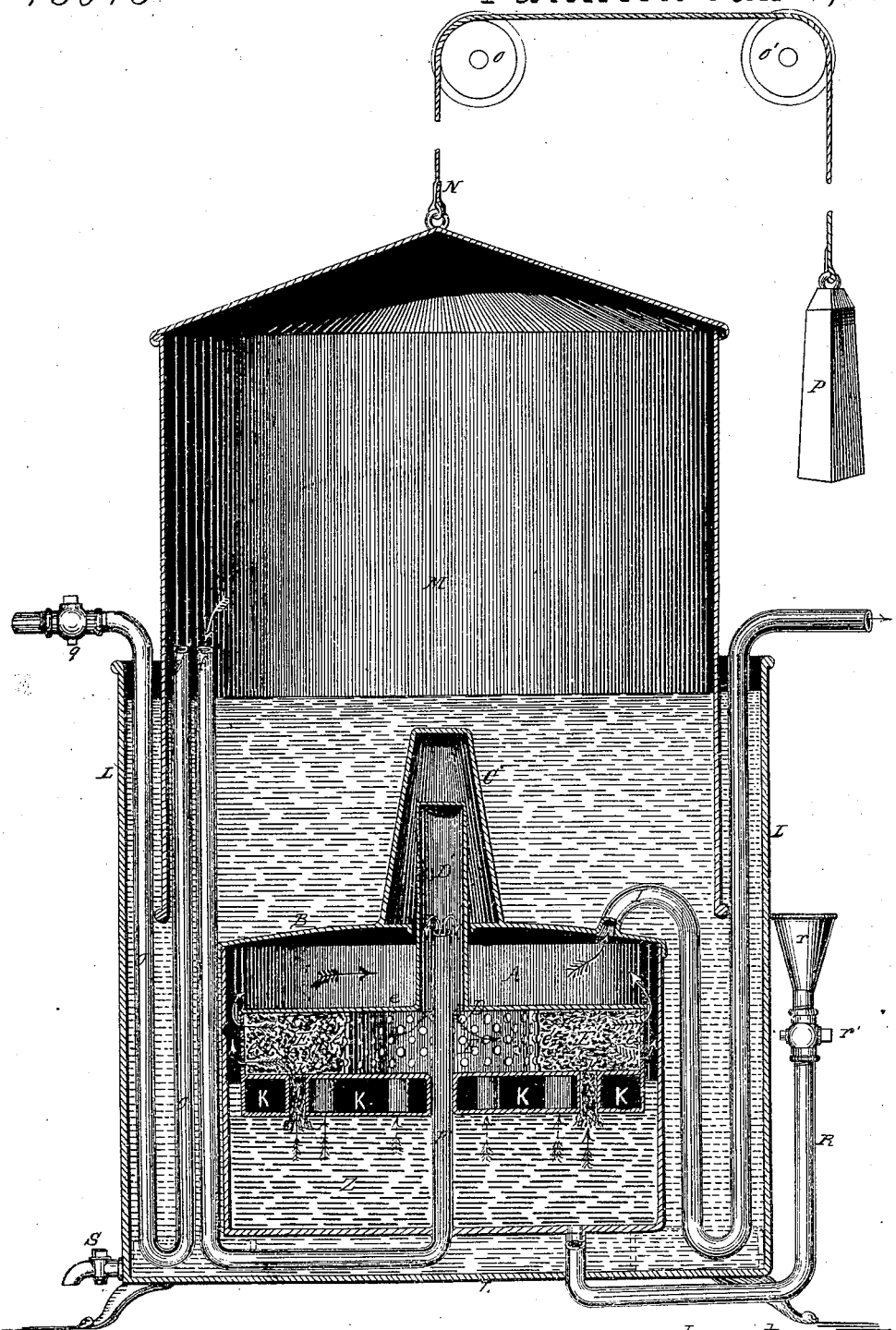

WILLIAM W. BIERCE, OF CLEVELAND, OHIO.

IMPROVED APPARATUS FOR CARBURETING.

Specification forming part of Letters Patent No. 73,073, dated January 7, 1868.

*To all whom it may concern:*

Be it known that I, WILLIAM W. BIERCE, of Cleveland, Cuyahoga county, Ohio, have invented a new and useful Air-Carbureting Apparatus; and I hereby declare the following to be a full, clear, and exact description thereof, reference being had to the accompanying drawing, the same being a vertical section, and forming part of this specification.

The carbureting-vessel Z may have the same essential parts as in my patent of April 1, 1867, for a gas-carbureting apparatus—to wit, a reservoir, A, for holding in its lower part the carbureting liquid, (carburetent,) and in its upper part the carbureted air or gas, the mingling-float D, and the induction-pipe F; but the parts which, in said patent, are employed for introducing and operating upon "street-gas" are, in the present device, employed preferably on atmospheric air.

As in my aforesaid patent, the carbureting-vessel Z consists, essentially, of a reservoir, A, having a movable cover, B, and spire C, the float D having, as in said patent, an annular chamber, E', which communicates with the volume of liquid in the lower part of the reservoir through ducts $k$, said chamber and ducts being stuffed with cotton, sponge, or other capillose, spongy, or bibulous substance. Perforations $e'$ in both inner and outer walls of the annular chamber E' afford communication from the central chamber E to the interior of the reservoir A. The float is surmounted with an elevated chamber, D', which contains within it the pipe F. The necessary buoyancy of my float may be obtained by a wooden disk, as in my patent aforesaid, or by means of air-chests K.

My above-described carbureting-vessel Z is entirely immersed in a water-tank, L, which, besides affording a complete safeguard against explosion, serves the purpose of a water-tight joint for my air-holder, and, in conjunction with said holder, prevents the escape of any fetid or combustible emanations.

The air-holder consists of an inverted cylindrical cup or vessel, M, of somewhat less diameter than the tank L, and which, being filled with air, operates by its gravity to force said air through the walls of the mingling chamber or float as fast as it is wanted. In order to maintain the verticality of the air-holder and to regulate its pressure, I suspend the said holder by a cord or chain, N, fastened at one end to the top of the holder, and having its other end passed over suitable sheaves, O and O', and carrying a counterpoise, P, which may be of less or greater weight, as may be found necessary. The downward pressure of the holder forces air into the chamber D' of the float through the inverted siphon or bent pipe F, whose inlet $f$ is situated above the water-level. Q is another inverted siphon or bent pipe, both of whose extremities are above the water-level, its receiving extremity or inlet being outside of the tank, and having a cock, $q$, and its discharging extremity $q'$ being within the air-holder. R is an inverted siphon, whose inlet has a funnel, $r$, and a cock, $r'$, and whose outlet is connected to the bottom of the reservoir A, into which it empties. Through this siphon, the cock $r'$ being opened, the said reservoir is charged with the carbureting liquid. Still another inverted siphon, I, receiving the carbureted air from the reservoir A, conducts it outside of the tank, and communicates, by suitable branches, with customary service-pipes or burners in the house or room to be lighted. The upper plates B and $e$ of the reservoir and float, respectively, may have marginal flanges, as represented, to retain them in place, yet permit of their removal when required. S is a cock to draw off water from the tank.

I have described a form of my improvement found effective for yielding a very cheap and yet brilliant illuminating-gas without the aid of heat, but reserve the right to vary the same. For example, stoppers or screw-caps may replace the cocks here represented. The holder M may be recharged by means of an air-pump attached to the outer end of the pipe Q, or through a pipe entering directly into the top of it, which pipe may be closed by a screw cap or cock. The spire C may be surmounted by a charging-orifice, closed by a suitable screw-cap. The holder M may be elevated by a windlass or other mechanical device.

The operation is as follows: The reservoir A having been charged with the carburetent, either through its open top or through the pipe R, and the annular chamber E and ducts $k$ having been packed with cotton, tow, sponge, or like substance, and the cover $e$ closed down, the said float is inserted in the reservoir, and the cover of the latter secured in place. Water is then poured in until it reaches above the spire C of the reservoir, and the cock $q$ being closed, the air-holder M is inverted over the reservoir, as shown, and immediately acts, by its weight, to force air through the pipe F into the float D, and to compel it to traverse the now saturated packing, so as to become charged with carburetent, and in that condition escape into the upper portion of the reservoir, whence it passes off through the pipe or siphon I to the service-pipes or burners. To refill the air-holder, it is only necessary to draw down the counterpoise, temporarily opening the cock $q$ at the same time.

It will be seen that gas is made or produced only as it is wanted, and occupies only the service-pipes and the carbureting-vessel, which vessel, from its small capacity and its total immersion in water, is rendered doubly free from danger. The holder M contains only common air, and there is no large or dangerous volume of explosive gas. The filling of the reservoir may take place outside of the building containing the carbureter, which itself may occupy a distinct building from the one to be lighted.

I claim herein as new and of my invention—

The immersed carbureting-vessel Z, with its contained float D, in combination with the gravitating air-holder M, tank L, and inverted siphons F I Q R, when arranged and employed substantially as and for the purpose set forth.

In testimony of which invention I hereunto set my hand.

WILLIAM W. BIERCE.

Witnesses:
GEO. H. KNIGHT,
W. H. RUNNELLS.